UNITED STATES PATENT OFFICE.

HIRAM L. HALL, OF BEVERLY, MASSACHUSETTS, ASSIGNOR TO THE BEVERLY RUBBER COMPANY, OF SAME PLACE.

IMPROVEMENT IN RESTORING WASTE VULCANIZED RUBBER.

Specification forming part of Letters Patent No. 25,160, dated August 16, 1859.

*To all whom it may concern:*

Be it known that I, HIRAM L. HALL, of Beverly, in the county of Essex and State of Massachusetts, have invented certain new and useful improvements in the process of restoring waste vulcanized or hard india-rubber— that is to say, such rubber which, being once cured or prepared by any of the processes described in the Letters Patent of the United States granted to Charles Goodyear, or any other processes applied for similar purposes, has by any means become waste or useless, or, having been manufactured in car-springs, shoes, packing, and other fabrics and substances, has served its purpose, or been heretofore deemed as having served its purpose, or been deemed to have become for any other cause unfit for the purpose of use, wearing, trade, or commerce—to such a soft, plastic, or gummy state that it may be used again in the manufacture of india-rubber substances and fabrics; and I do hereby declare that the following is a full and exact specification of my said improvements, by which my process may be distinguished from all others for a similar purpose, together with the points therein which I claim and desire to have secured to me by Letters Patent.

Various processes have been recently had, some of which have been patented, for restoring waste vulcanized rubber to a soft, plastic, or gummy state; but some of them are too expensive to be extensively used in practice, requiring great care from experienced chemists, and others bring out but imperfect results. I have already obtained Letters Patent, issued November 30, 1858, to the Beverly Rubber Company as my assignee, for the process of restoring waste vulcanized rubber by submitting it to the action of steam, and my present application is for an improvement upon that process. The restoration in that case is effected by common steam; but I have discovered that new and improved effects may be obtained by the use of "stame," or superheated steam, in the process.

In restoring rubber by this new process I first grind the rubber and reduce it to a finely-divided state, and then place it in a close steam-boiler or other suitable vessel, into which steam is conducted through a steam-pipe. In its passage through the pipe the steam is superheated in the ordinary manner by applying heat to the pipe. This is conveniently done by forming the pipe in a coil, which is placed in a small furnace. By the action of this superheated steam the vulcanized rubber is rendered more plastic and soft than it can be made by any other process, and the operation is of much shorter duration, and I thus obtain much more perfect results in restored rubber, and with much saving of fuel.

I do not limit myself to any particular degrees of heat or of pressure in my process, as these admit of considerable variation.

This process is also applicable to vulcanized gutta-percha.

I do not claim the use of common steam, as that is the subject of Letters Patent previously granted; but What I do claim as my invention, and desire to have secured to me by Letters Patent, is—

The restoring of waste vulcanized rubber or gutta-percha by the use of superheated steam, substantially in the manner and for the purpose above described.

H. L. HALL.

Witnesses:
JOSEPH GAVETT,
ALBERT W. BROWN.